Patented June 1, 1954

2,680,120

UNITED STATES PATENT OFFICE 2,680,120

AZIDOSULFONYLPHENYLAMIDO PROPANE-DIOLS AND A METHOD FOR THEIR PREPARATION

Walter A. Gregory, Wilmington, Del., assignor to E. I. du Pont de Nemours and Company, Wilmington, Del., a corporation of Delaware No Drawing. Application January 23, 1953, Serial No. 333,020

6 Claims. (Cl. 260—349)

The aryl amidopropanediols have recently been found useful in the pharmaceutical field. I have now found that certain azidosulfonylphenylamidopropanediols have outstanding value for a variety of uses.

The azidosulfonylphenylamidopropanediols of my invention can be represented by the formula

1.

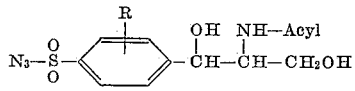

where R represents hydrogen, halogen, lower alkyl and lower alkoxy radicals; and acyl represents a radical such as acetyl, chloroacetyl, bromoacetyl, dichloroacetyl, dibromoacetyl and like radicals.

I regard the presence of the azidosulfonyl group peculiarly significant and believe that this group lends to the phenylamidopropanediols their unusual and valuable properties.

The terms "lower alkyl" and "lower alkoxy" are used herein to include all alkyl and alkoxy radicals containing not more than 6 carbon atoms.

Illustrative of the azidosulfonylphenylamidopropanediols of my invention are:

1-(p-azidosulfonylphenyl) - 2 - (alpha,alpha- dichloroacetamido)-1,3-propanediol
1-(p-azidosulfonylphenyl) - 2 - (alpha,alpha- dibromoacetamido)-1,3-propanediol
1-(4-azidosulfonyl-2-methylphenyl) - 2 - (alpha,-alpha-dichloroacetamido)-1,3-propanediol
1-(4-azidosulfonyl-3-chlorophenyl) - 2 - (alpha,-alpha-dichloroacetamido)-1,3-propanediol
1-(p-azidosulfonylphenyl) -2- (alpha-chloroacetamido)-1,3-propanediol
1-(p-azidosulfonylphenyl) -2- (alpha-bromoacetamido)-1,3-propanediol
1-(p-azidosulfonylphenyl) -2-acetamido-1,3- propanediol
1-(4-azidosulfonyl-2-bromo) -2- (alpha,alpha-dichloroacetamido)-1,3-propanediol
1-(4-azidosulfonyl-2-fluorophenyl) - 2 - (alpha,-alpha-dichloroacetamido)-1,3-propanediol
1-(4-azidosulfonyl-3 - ethylphenyl) - 2 - (alpha,-alpha-dichloroacetamido)-1,3-propanediol
1-(4-azidosulfonyl-2-methoxyphenyl) -2-(alpha,-alpha-dichloroacetamido)-1,3-propanediol
1-(4-azidosulfonyl-3-ethoxyphenyl) - 2 - (alpha,-alpha-dichloroacetamido)-1,3-propanediol
1-(4-azidosulfonyl-3-isopropyl) -2- (alpha,alpha-dichloroacetamido)-1,3-propanediol
1-(4-azidosulfonyl-3- sec - butylphenyl) - 2 - (alpha,alpha-dichloroacetamido)-1,3-propanediol
1-(4-azidosulfonyl-3-butoxyphenol)- 2 - (alpha,-alpha-dichloroacetamido)-1,3-propanediol The compounds of my invention can be prepared from previously known organic compounds by novel syntheses which I have discovered. In these syntheses there are involved a number of new intermediate organic compounds.

Certain of these new intermediate compounds and all of the compounds represented by Formula 1 may exist in the optical isomeric form. Stereoisomeric forms as used herein refer to the spatial arrangement of the polar groups on the two asymmetric carbon atoms with reference to erythrose and threose.

To differentiate between these two possible forms the diastereoisomeric pair related to erythrose in configuration will hereafter be designated as the erythro series and the diastereoisomeric pair related to threose as the threo series or form.

To further designate the threo form of the compounds of my invention I have designated as the threo form the product obtained from the reaction between the threo form of a fluorosulfonylphenylamido-1,3-propanediol having the formula

2.

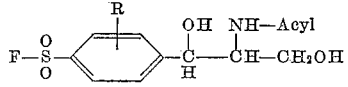

where R and acyl have the same significance as in Formula 1 with a metal salt of a hydrazoic acid.

Both the threo and erythro forms exist as racemates of optically active dextro (d) and levo (l) rotatory isomers as well as in the form of the individual or separated dextro (d) and levo (l) optical isomers.

In view of the difficulty of representing the various optical isomers with plane formulas, I have used the customary structural formulas and adapted the convention shown below in order to designate their optical configuration. An appropriate nomenclature is used under the formula, for example, (l)-threo form, (d)-threo form, (dl)-threo form, (l)-erythro form, (d)-erythro form and the like.

It will be understood that where no notation appears with a structural formula or with a chemical name the formula or name is to be interpreted in its generic sense; that is, as representing the (d)-threo, (l)-threo isomers or (d)-erythro, (l)-erythro isomers in separated form as well as the (dl)-threo or (dl)-erythro optical racemates or the mixture of all of the isomers and racemates. In other words, a formula or name represents not only the unresolved mixture of isomers but also the individual isomers and racemates.

One of the methods for the production of the azidosulfonylphenylamidopropanediols of the invention comprises effecting reaction between a fluorosulfonylphenylamidopropanediol of Formula 2 with a metal salt of hydrazoic acid in a liquid medium.

The fluorosulfonylphenylamidopropanediols represented by Formula 2 and employed in the synthesis of the compounds of the present invention are fully described and claimed in my copending application Serial No. 296,960 filed July 2, 1952. The fluorosulfonylphenylamido-1,3-propanediols can be prepared from a substituted benzenesulfonyl fluoride of the formula 3. 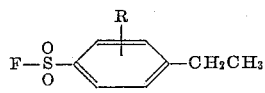

where R has the same significance as in Formulas 1 and 2 in accordance with the process described and claimed in my aforementioned copending application. The process comprises, in brief, reacting a compound of Formula 3 with potassium permanganate and magnesium nitrate, followed by halogenation, addition of hexamethylenetetramine, treatment with sulfur dioxide and water, acidification, acylation, treatment with formaldehyde and a weak base, and finally a sodium borohydride reduction, or a Meerwein-Ponhelorff-Verley reduction.

Any of a variety of liquid media can be employed. There may be employed, for instance, dimethylformamide, dimethylacetamide, water, methanol, ethanol, n-propanol, isopropanol, dioxane, tetrahydrofurane, acetonitrile, ethyl acetate, acetone, methyl ethyl ketone, cyclopentonone, cyclohexanone, trimethylamine, triethylamine, pyridine and mixtures thereof. Of these, I prefer the water-soluble alcohols alone or mixed with water. Also preferred are dimethylformamide and dimethylacetamide.

It will be understood that the liquid medium is one which is inert—under the reaction conditions described herein—both to the fluorosulfonylamidopropanediol and to the metallic salt of hydrazoic acid employed to produce the compounds of my invention.

The temperature at which the reaction between the compound of Formula 2 and the metal azide is not critical. Elevated temperature may be used, but even at normal room temperature the desired reaction is readily effected.

Any of a variety of the metal salts of hydrazoic acid may be employed. There may be employed, for instance, the alkali and alkaline earth metal azides. Illustrative of the metal azides which can be used are sodium azide, potassium azide, calcium azide, magnesium azide, lithium azide, lead azide and silver azide. Of these, sodium azide is preferred.

An alternative method for the production of the azidosulfonylphenylamidopropanediols of the present invention can be diagrammatically represented below. R and acyl have the same significance as in Formulas 1 and 2, and M represents a metallic radical.

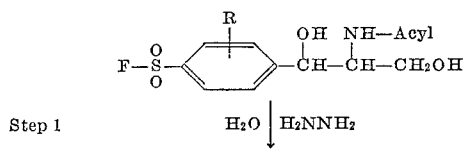

Step 1

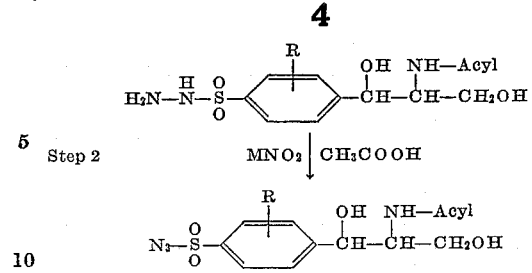

Step 1 of the process shown above involves effecting reaction between a fluorosulfonylamido-1,3-propanediol of Formula 2 with hydrazine to produce a hydrazinosulfonylphenylamido-1,3-propanediol. Hydrazine hydrate, a commercially available reagent, can be employed and is preferred.

This first step is exothermic. Consequently, it is often preferable to employ external cooling to keep the temperature of the reaction mixture below about 40° C.

In the second step, the hydrazinosulfonylphenylamidopropanediol resulting from step 1 is reacted with nitrous acid to produce the azidosulfonylphenylamidopropanediols of this invention. The nitrous acid may be prepared in any of a variety of methods. It may be produced in situ. An alkali metal nitrite may be reacted with acetic acid, as shown in the diagram. Or hydrochloric acid in aqueous medium can be reacted with an alkali metal nitrite. The reaction between the nitrous acid and the hydrazinosulfonylphenylamidopropanediol can be carried out at normal room temperature. But it is often preferred to effect the reaction at about 0° C.

The individual threo stereoisomeric form of the azidosulfonylphenylamidopropanediols can be resolved into their optical isomers following the completion of step 2 and hydrolysis with a hydrohalide acid to the amine salt. This resolution can be effected by forming an acid salt of the racemic amine of threo form with an optically active acid such as, for instance, (d)-camphor sulfonic acid, (l)-camphor sulfonic acid, (d)-tartaric acid, (l)-tartaric acid, (d)-mandelic acid and (l)-mandelic acid; by treating the hydrohalide salt with one of the above-named acids in the presence of an equivalent quantity of silver oxide or silver carbonate; separating the two diastereoisomeric products by recrystallization from a solvent such as, for instance, a lower aliphatic alcohol or mixtures of the same with water or other organic solvents; and then regenerating the individually optically active isomers from the separated diastereoisomeric addition salts by treating each one separately with caustic or with a basic ion exchange resin.

When carrying out the resolution, as set forth above, it is preferred but not essential to choose the form of the optically active acid so that the diastereoisomer of which the desired optical isomer is a part will separate from the crystallization solution first.

As already indicated, the azidosulfonylphenylamidopropanediols of my invention have a variety of uses. They can be used as corrosion inhibitors for acid solutions on metal; as blowing agents for polymeric materials, such as rubber and styrene; and as anti-halation agent in photography. They may also be employed in electroplating, for instance, they may be added to cyanide-cadmium baths to produce a desirable deposit. The compounds have further utility in that they can be employed as disinfectants for the treatment of biological laboratory waste. The compounds find still further use as drugs in the control of bacterial and rickettsial infections.

In order to more fully understand the invention, reference should be had to the following illustrative examples:

EXAMPLE 1

*Preparation of (dl)-threo-1-(p-azidosulfonylphenyl)-2-(alpha,alpha-dichloroacetamido)-1,3-propanediol*

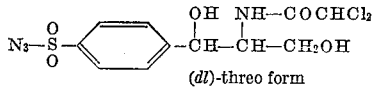
(dl)-threo form

A solution of 8 g. of dl-threo-1-(p-fluorosulfonylphenyl)-2-alpha,alpha-dichloroacetamido)-1,3-propanediol, prepared as described in my copending application Serial No. 296,960, filed July 2, 1952, in 50 cc. of N,N-dimethylacetamide is stirred with 2 g. of powdered sodium azide for a period of three hours. A bright yellow color forms in the solution which becomes less intense after one hour. The mixture is diluted with 500 cc. of water. After the diluted mixture stands briefly, a crystalline product separates. The crude crystalline product is dried. It is found to melt with evolution of gas at 144–147° C.

The product is preferably purified to yield solvent-free material by dissolving it in cold methanol and diluting with water. White needles consisting of (dl)-threo-1-(p-azidosulfonylphenyl)-2-(alpha,alpha-dichloroacetamido)-1,3-propanediol are obtained. The material melts at 150–151° C.

Analysis calculated for $C_{11}H_{12}Cl_2N_4O_5S$: C, 34.47; H, 3.16; N, 14.62. Found: C, 34.66; H, 3.29; N, 14.55.

EXAMPLE 2

*Alternative preparation of (dl)-threo-1-(p-azidosulfonylphenyl)-2-(alpha,alpha-dichloroacetamido)1,3-propanediol*

A suspension of 1.00 g. of (dl)-threo-1-(p-fluorosulfonylphenyl)-2-(alpha,alpha-dichloroacetamido)1,3-propanediol in 2 cc. of 64% aqueous hydrazine hydrate is stirred. The suspension is externally cooled to keep the temperature of the reaction mixture below 40° C. The solid reactant dissolves in about 10 minutes. At the end of 15 minutes, the solution is brought to about pH 8 by adding concentrated hydrochloric acid. The solution is kept cold during the addition of acid. The product, which separates from the solution as white crystals, consists essentially of (dl)-threo-1-(p-hydrazinosulfonylphenyl)-2-(alpha,alpha-dichloroacetamido)1,3-propanediol, M. P. 162–165°. Its formula is as follows:

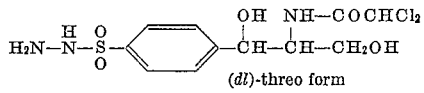
(dl)-threo form

A solution of 0.50 g. of (dl)-threo-1-(p-hydrazinosulfonylphenyl)-2-(alpha,alpha-dichloroacetamido)-1,3-propanediol in 3 cc. of 5% hydrochloric acid at 0° C. is stirred as 0.25 g. of sodium nitrite is added slowly to it. The desired product, (dl)-threo-1-(p-azidosulfonylphenyl)-2-(alpha,alpha-dichloroacetamido)-1,3-propanediol, separates from the solution as white needles. The product can be purified as indicated in Example 1. It melts at 150–151° C. and does not depress the melting point of the product obtained in Example 1.

I claim:

1. A compound of the formula,

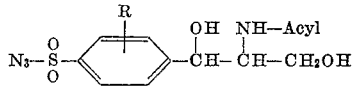

where R is a member of the class consisting of hydrogen, halogen, lower alkyl and lower alkoxy radicals, and acyl is a member of the class consisting of acetyl, chloroacetyl, bromoacetyl, dichloroacetyl and dibromoacetyl radicals.

2. (dl)-threo-1-(p-azidosulfonylphenyl)-2-(alpha,alpha-dichloroacetamido)-1,3-propanediol.

3. (dl)-threo-1-(p-azidosulfonylphenyl)-2-acetamido-1,3-propanediol.

4. (d)-threo-1-(p-azidosulfonylphenyl)-2-(alpha,alpha-dichloroacetamido)-1,3-propanediol.

5. (l)-threo-1-(p-azidosulfonylphenyl)-2-(alpha,alpha-dichloroacetamido)-1,3-propanediol.

6. A process for preparing an azidosulfonylamido-1,3-propanediol of the formula

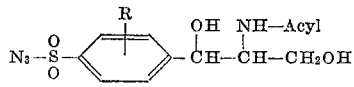

where R is a member of the class consisting of hydrogen, halogen, lower alkyl and lower alkoxy radicals, and acyl is a member of the class consisting of acetyl, chloroacetyl, bromoacetyl, dichloroacetyl and dibromoacetyl radicals which comprises effecting reaction in a liquid medium between a metal salt of hydrazoic acid and a fluorosulfonylamido-1,3-propanediol of the formula,

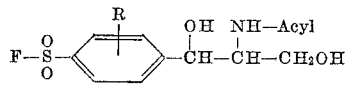

where R and acyl have the same significance as above.

References Cited in the file of this patent

UNITED STATES PATENTS

| Number | Name | Date |
|---|---|---|
| 2,518,249 | Ott | Aug. 8, 1950 |
| 2,552,065 | Schoene | May 8, 1951 |

OTHER REFERENCES

Steinkoff: "J. Prakt Chem.," vol. 117 (1927), series 2, pp. 58, 59 and 71.